United States Patent
Daniel et al.

(10) Patent No.: US 9,807,106 B2
(45) Date of Patent: Oct. 31, 2017

(54) MITIGATING BLOCKCHAIN ATTACK

(71) Applicant: BRITISH TELECOMMUNICATIONS PUBLIC LIMITED COMPANY, London (GB)

(72) Inventors: Joshua Daniel, London (GB); Gery Ducatel, London (GB); Theo Dimitrakos, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/223,261

(22) Filed: Jul. 29, 2016

(65) Prior Publication Data

US 2017/0034197 A1 Feb. 2, 2017

(30) Foreign Application Priority Data

Jul. 31, 2015 (EP) .................................... 15179440

(51) Int. Cl.
G06F 21/00 (2013.01)
H04L 29/06 (2006.01)
G06Q 20/06 (2012.01)

(52) U.S. Cl.
CPC ....... *H04L 63/1425* (2013.01); *G06Q 20/065* (2013.01); *H04L 63/1416* (2013.01); *H04L 63/1458* (2013.01); *G06Q 2220/00* (2013.01); *H04L 2209/56* (2013.01); *H04L 2463/102* (2013.01)

(58) Field of Classification Search
CPC .................................................. H04L 63/1425
USPC ........................................................... 726/22
See application file for complete search history.

(56) References Cited

U.S. PATENT DOCUMENTS

2015/0120567 A1    4/2015  Van Rooyen
2015/0332283 A1*  11/2015  Witchey ............... G06Q 30/018
                                                             705/3

OTHER PUBLICATIONS

Extended European Search Report, Application No. 15179440.1, mailed Feb. 10, 2016, 6 pages.
(Continued)

*Primary Examiner* — Longbit Chai
(74) *Attorney, Agent, or Firm* — Patterson Thuente Pedersen, P.A.

(57) ABSTRACT

A computer implemented method for detecting malicious events occurring with respect to a blockchain data structure comprising: defining a transaction creation profile according to which transactions can be generated and submitted to the blockchain; submitting a transaction to the blockchain, the transaction causing the generation of a profiler data structure in the blockchain including executable code to generate profile transactions to be submitted to the blockchain according to the transaction creation profile; monitoring the blockchain to identify profile transactions; and comparing identified profile transactions with the transaction creation profile to detect a deviation from the transaction creation profile, such detection corresponding to a malicious event occurring with respect to the blockchain.

13 Claims, 3 Drawing Sheets

(56) References Cited

OTHER PUBLICATIONS

Joseph Bonneau et al., "Research Perspectives and Challenges for Bitcoin and Cryptocurrencies", International Association for Cryptologic Research, vol. 20150323:173252, Mar. 19, 2015.
Florian Tschorsch et al., "Bitcoin and Beyond: A Technical Survey on Decentralized Digital Currencies", International Association for Cryptologic Research, vol. 20150517: 090557, May 15, 2015, pp. 1-37.

* cited by examiner

MITIGATING BLOCKCHAIN ATTACK

RELATED APPLICATION

The present application claims priority to EP Application No. 15179440.1 filed Jul. 31, 2015, which is hereby incorporated herein in its entirety by reference.

TECHNICAL FIELD

The present disclosure relates to blockchain data structure security. In particular it relates to detecting and mitigating blockchain attacks.

BACKGROUND

A blockchain database or data structure is a sequential transactional database that may be distributed and is communicatively connected to a network. Sequential transactional databases are well known in the field of cryptocurrencies and are documented, for example, in "Mastering Bitcoin: Unlocking Digital Crypto-Currencies," (Andreas M. Antonopoulos, O'Reilly Media, April 2014). For convenience, such a database is herein referred to as a blockchain though other suitable databases, data structures or mechanisms possessing the characteristics of a sequential transactional database can be treated similarly. A blockchain provides a distributed chain of block data structures accessed by a network of nodes known as a network of miners. Each block in the blockchain includes one or more transaction data structures. In some blockchains, such as the BitCoin blockchain, the blockchain includes a Merkle tree of hash or digest values for transactions included in the block to arrive at a hash value for the block, which is itself combined with a hash value for a preceding block to generate a chain of blocks (blockchain). A new block of transactions is added to the blockchain by miner software, hardware, firmware or combination components in the miner network. Miners are communicatively connected to sources of transactions and access or copy the blockchain. A miner undertakes validation of a substantive content of a transaction (such as criteria and/or executable code included therein) and adds a block of new transactions to the blockchain when a challenge is satisfied, typically such challenge involving a combination hash or digest for a prospective new block and a preceding block in the blockchain and some challenge criterion. Thus miners in the miner network may each generate prospective new blocks for addition to the blockchain. Where a miner satisfies or solves the challenge and validates the transactions in a prospective new block such new block is added to the blockchain. Accordingly the blockchain provides a distributed mechanism for reliably verifying a data entity such as an entity constituting or representing the potential to consume a resource.

While the detailed operation of blockchains and the function of miners in the miner network is beyond the scope of this specification, the manner in which the blockchain and network of miners operate is intended to ensure that only valid transactions are added within blocks to the blockchain in a manner that is persistent within the blockchain. Transactions added erroneously or maliciously should not be verifiable by other miners in the network and should not persist in the blockchain. This attribute of blockchains is exploited by applications of blockchains and miner networks such as cryptocurrency systems in which currency amounts are expendable in a reliable, auditable, verifiable way without repudiation. For example, blockchains are employed to provide certainty that a value of cryptocurrency is spent only once and double spending does not occur (that is spending the same cryptocurrency twice).

Despite the architecture of blockchain systems, malicious attacks present a threat to the security and reliability of blockchains. One such malicious attack involves a single entity (or entities under common control) procuring or appearing to procure sufficient computing resource to constitute more than half of all mining resource working with a blockchain. The mechanism of this attack is documented at en.bitcoin.it/wiki/Majority_attack as follows (creative commons attribution license 3.0):

A majority attack (usually labeled 51% attack or >50% attack) is an attack on the network. This attack has a chance to work even if the merchant waits for some confirmations, but requires extremely high relative hashrate. The attacker submits to the merchant/network a transaction which pays the merchant, while privately mining a blockchain fork in which a double-spending transaction is included instead. After waiting for n confirmations, the merchant sends the product. If the attacker happened to find more than n blocks at this point, he releases his fork and regains his coins; otherwise, he can try to continue extending his fork with the hope of being able to catch up with the network. If he never manages to do this, the attack fails and the payment to the merchant will go through. The work done mining will also go to waste, as any new bitcoins would be overwritten by the longest chain. The probability of success is a function of the attacker's hashrate (as a proportion of the total network hashrate) and the number of confirmations the merchant waits for. For example, if the attacker controls 10% of the network hashrate but the merchant waits for 6 confirmations, the success probability is on the order of 0.1%. If the attacker controls more than half of the network hashrate, this has a probability of 100% to succeed. Since the attacker can generate blocks faster than the rest of the network, he can simply persevere with his private fork until it becomes longer than the branch built by the honest network, from whatever disadvantage. No amount of confirmations can prevent this attack.

Other attacks also pose a threat to the blockchain and its users, including: the Sybil attack in which an entity attempts to fill a miner network with clients controlled centrally or pseudonymous miners; and various denial of service attacks such as sending excessive data to a miner to overwhelm the miner such that it cannot process normal blockchain transactions.

Accordingly it would be advantageous to provide a mechanism for detecting and mitigating threats to blockchain environments.

SUMMARY

The present disclosure accordingly provides, in a first aspect, a computer implemented method for detecting malicious events occurring with respect to a blockchain data structure comprising: defining a transaction creation profile according to which transactions can be generated and submitted to the blockchain; submitting a transaction to the blockchain, the transaction causing the generation of a profiler data structure in the blockchain including executable code to generate profile transactions to be submitted to the blockchain according to the transaction creation profile; monitoring the blockchain to identify profile transactions;

and comparing identified profile transactions with the transaction creation profile to detect a deviation from the transaction creation profile, such detection corresponding to a malicious event occurring with respect to the blockchain.

Advantageously the profile transactions include an address of the profiler data structure and wherein monitoring the blockchain includes monitoring transactions including the address of the profiler data structure.

Advantageously the method further comprises repeatedly generating transactions directed to the profiler data structure and submitted to the blockchain so as to trigger execution of the executable code of the profiler data structure.

Advantageously transactions submitted to the blockchain are processed by miner software components to validate the transactions and commit the transactions to a block for addition to the blockchain.

Advantageously the method further comprises, in response to the detection of a deviation from the transaction creation profile, generating a notification signal for communication to one or more entities operating with the blockchain to flag the malicious event.

Advantageously the method further comprises, in response to the detection of a deviation from the transaction creation profile, ceasing operation with the blockchain.

The present disclosure accordingly provides, in a second aspect, a computer system to detect malicious events occurring with respect to a blockchain data structure comprising a processor and a data store wherein the processor is adapted to undertake the steps of: defining a transaction creation profile according to which transactions can be generated and submitted to the blockchain; submitting a transaction to the blockchain, the transaction causing the generation of a profiler data structure in the blockchain including executable code to generate profile transactions to be submitted to the blockchain according to the transaction creation profile; monitoring the blockchain to identify profile transactions; and comparing identified profile transactions with the transaction creation profile to detect a deviation from the transaction creation profile, such detection corresponding to a malicious event occurring with respect to the blockchain.

The present disclosure accordingly provides, in a third aspect, a computer program element comprising computer program code to, when loaded into a computer system and executed thereon, cause the computer to perform the steps of a method as described above.

BRIEF DESCRIPTION OF THE DRAWINGS

Embodiments will now be described, by way of example only, with reference to the accompanying drawings, in which.

DETAILED DESCRIPTION

Figure 1:
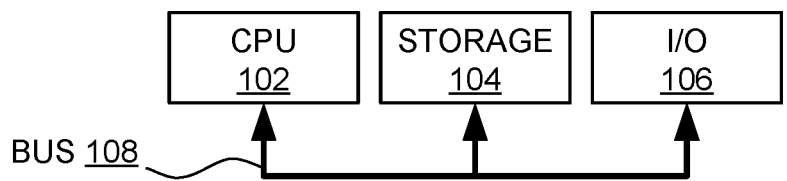
FIG. 1 is a block diagram of a computer system suitable for the operation of embodiments.

FIG. 1 is a block diagram of a computer system suitable for the operation of components in embodiments. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
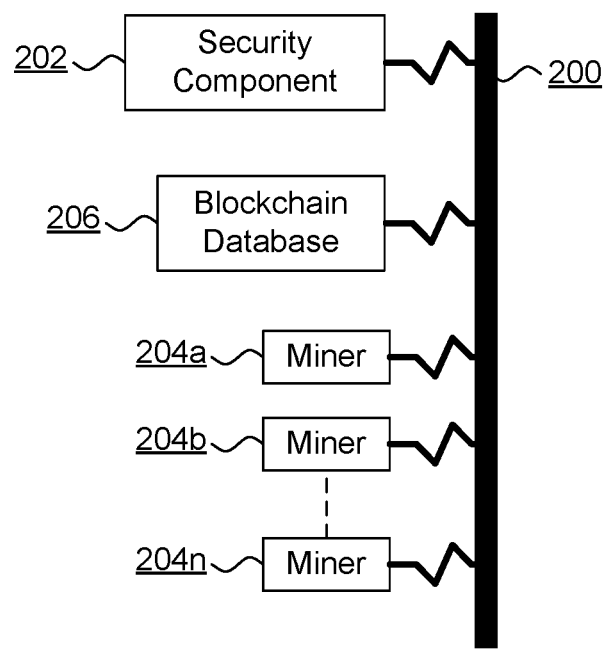
FIG. 2 is a component diagram of an exemplary computer system arrangement for detecting a blockchain attack in accordance with an embodiment.

FIG. 2 is a component diagram of an exemplary computer system arrangement for detecting a blockchain attack in accordance with an embodiment. A network 200 is provided as a wired or wireless physical or virtual communication medium for communicatively connecting computing components such as computer systems, data storage systems, physical or virtualised components such as software stacks and the like. The network 200 is depicted as a single continuous entity though it will be appreciated that the network 200 could have any communications network topology and/or arrangement. In some embodiments the network 200 is a series of communicatively connected networks or a logical arrangement of networks or subnetworks operating over potentially numerous underlying physical networks. In some embodiments the network 200 is the internet.

In communication with the network is provided a blockchain database 206, hereinafter a blockchain, as a sequential transactional database that may be distributed and is communicatively connected to a network 200. The blockchain 206 is substantially as hereinbefore described. Accessing the blockchain 206 are miner components 204 as software, hardware, firmware or combination components adapted to access transactions submitted to the blockchain 206 for validation of the transactions and for generating new blocks of validated transactions for appending to the blockchain 206. The miners 204 are required to demonstrate a "proof of work" such as by evaluation of a hashing process to achieve a particular output as is known, for example, from the BitCoin crypocurrency blockchain. The arrangement of FIG. 2 further includes a security component 202 as a network connected software, hardware, firmware or combination component adapted to detect malicious events occurring with respect to the blockchain 206 as will be described in detail below with respect to FIG. 3. For example the security component is a physical or virtual computer system or an application or service executing on a computer system communicatively connected to the blockchain 206 via the network 200.

In summary, in use, the security component 202 generates a new data structure known as a profiler data structure (hereinafter, profiler) for storage in the blockchain 206. The profiler includes executable logic that is executed when the profiler is validated by a miner 204. The profiler logic includes code to cause the generation of new transactions for storage in the blockchain known as profile transactions. In particular, the profile transactions are generated by the profiler according to one or more rules specified in a transaction creation profile that is codified in the profiler logic. The transaction creation profile is defined by the security component 202 and determines when profile transactions are to be generated by the profiler. Accordingly, when the profiler is validated by a miner, the logic of the profiler determines if a profile transaction should be generated based on the transaction creation profile. For example, a simple transaction creation profile can require generation of a profile transaction after every fixed time interval, such as hourly or more frequently. More complex transaction creation profiles can be contemplated, such as profiles based on a state, size, composition or other characteristics of the blockchain itself or other entity or criteria.

Thus, in embodiments, the generation of profile transactions becomes predictable in view of the transaction creation profile. The precise mechanism for triggering the execution of the profiler to effect the transaction creation profile can vary. For example, the profiler can be triggered routinely by the security component 202 periodically generating transactions directed at the profiler for causing miners 204 to validate the profiler and execute the profiler logic. Alternatively, the profiler can be self-executing such as by the generation of transactions directed to itself such that it always executes in response to each such generated transaction. For example, on an initial execution the profiler determines if a profile transaction should be generated. If the profile transaction should not be generated then a benign transaction (i.e. not a profile transaction) is generated directed to the profiler to assure a further execution of the profiler by miners 204. Of course if a profile transaction should be generated then a profile transaction is generated which can also be directed to the profiler and which also assures a further execution of the profiler by miners 204.

The security component 202 monitors the blockchain to ensure the generation of profile transactions complies with the transaction creation profile. Generation of profile transactions in compliance with the transaction generation profile indicates faithful validation and execution of the profiler by miners 204. However, where profile transactions do not appear in the blockchain 206 as expected then non-compliance is identified and a malicious event occurring in respect of the blockchain 206 is detected. Such an occurrence results from miners 204 not correctly validating and executing the profiler (and likely also other transactions and data structures) stored in the blockchain 206. Indeed an absence of one or very few expected profile transactions is enough to warrant alarm that a malicious event has occurred in respect of the blockchain 206. Accordingly, the presence of malicious or erroneously operating miners 204 can be identified and mitigating or remedial action can be taken. Such action can include: generating an alert; communicating the non-compliance with the transaction creation profile to other entities operating with the blockchain 206, such as other computer systems relying on the blockchain 206; terminating access to the blockchain 206; protection of assets recorded in and dependent on the blockchain 206; and inspection of transactions occurring in the blockchain for further anomalous, erroneous and/or malicious occurrences.

In one embodiment a plurality of security components 202 are provided, each in association with computing components operating with the blockchain 206 such as application software employing the blockchain 206. Such software can be disparate, unrelated and associated with potentially different organizations and/or users and the security component 202 can be provided as a plug-in, library or other resource suitable for operation with such software. Each such security component 202 can define its own transaction creation profile and create its own specific profiler for generating profiler-specific profile transactions. In such an embodiment communication can be provided via the network 200 or another communication means between the multiple security components 202 for the sharing of information relating to the compliance of profile transactions. In this way the detection by any subset of the security components 202 can be corroborated by other security components 202 especially if a number of malicious or erroneous miners 204 increases.

Figure 3:
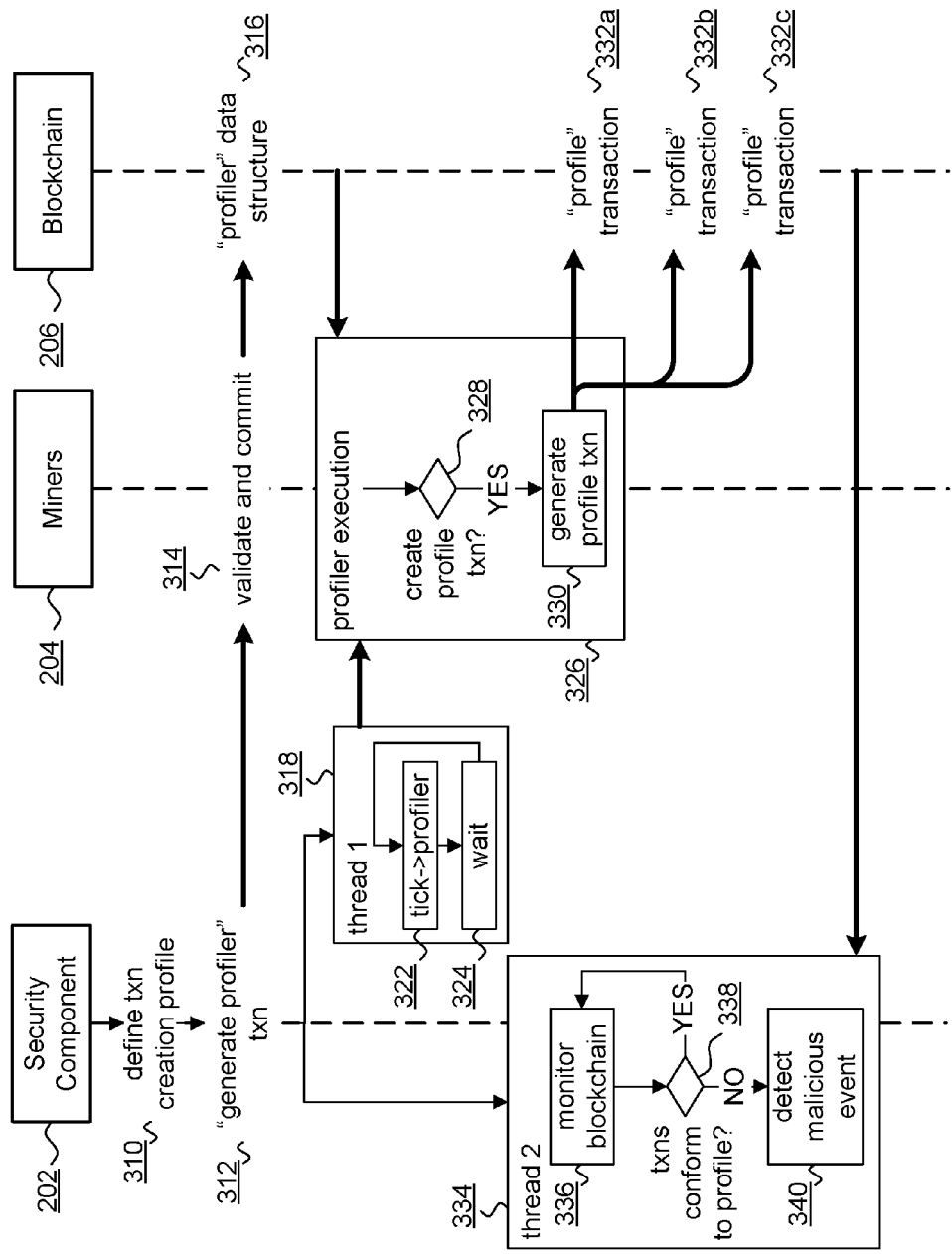
FIG. 3 is an exemplary flow diagram illustrating interactions between the components of FIG. 2 in detecting a malicious event in respect of a blockchain in accordance with an embodiment.

FIG. 3 is an exemplary flow diagram illustrating interactions between the components of FIG. 2 in detecting a malicious event in respect of a blockchain 206 in accordance with an embodiment. The security component 202 initially defines a transaction creation profile at 310. The transaction creation profile is a definition of when profile transactions are to be generated and submitted to the blockchain 206 and the profile thus determines points in time. The points in time can be determined based on any suitable attribute or characteristic accessible by a miner executing the profiler logic. For example the profile can be based on a time interval. Alternatively a state of the blockchain 206 can be used, such as a size or age of the blockchain 206, a number of blocks in the blockchain 206 or any other characteristic of the blockchain 206. The profile can be defined in terms of one or more rules that, when satisfied, lead to the generation of profile transactions. Such rules can be simplistic or complex and even stochastic. For example, the transaction creation profile can define that a profile transaction is generated whenever a value corresponding to the size of the blockchain 206 ends 'ABC' in HEX.

Subsequently, at 312, the security component generates a new transaction for submission to the blockchain 206. The new transaction is a "generate profiler" transaction such as a transaction for generating a new blockchain data structure as are known to those skilled in the art. The generate profiler transaction includes a definition of executable logic for inclusion in the profiler data structure such that, when validated by a miner 204, the profiler data structure is generated and stored in the blockchain 206 complete with the executable logic. The executable logic for the profiler includes an implementation of one or more rules corresponding to the transaction creation profile and logic to generate a profile transaction when occasioned by such logic. In some embodiments the profiler logic can also include logic to generate benign (non-profile) transactions to effect repeated self-execution of the profiler to ensure continual checking of the transaction creation profile. At 314 the transaction to generate the profiler is validated by miners 204, and at 316 the profiler is stored to the blockchain 206.

Subsequently, the security component 202 divides into two threads of execution. The first thread 318 provides for a regular invocation of the profiler in one embodiment. It will be appreciated that other mechanisms for invoking the profiler could be employed, such as self-execution as described above, in which case the logic of the first thread 318 may not be required. In the first thread 318 the security component 202 undertakes an iteration in which the profiler initially generates a transaction for the blockchain 206 the validation of which triggers execution of the profiler 326 (a regular 'tick' sent to the profiler). Subsequently the iteration waits 324 for a defined time period before repeating the triggering 322. In response to the triggering 322 the profiler execution 326 tests if a profile transaction should be created at 328. The test is based on the codification of the transaction creation profile in the profiler logic. Where the logic determines that a profile transaction should be generated, the process generates a profile transaction at 330 for storage in the blockchain 206. Three exemplary profile transactions are illustrated 332a, 332b and 332c each generated and stored in the blockchain 206 at particular points in time in accordance with the transaction creation profile.

The security component 202 also undertakes a second thread 334 of processing in which the security component 202 initially monitors 336 the blockchain 206 to determine if profile transactions are generated in compliance with the transaction creation profile. Monitoring the blockchain 206 can involve reading the blockchain 206 such as a most recent one or more blocks of the blockchain 206. At 338 the method determines if profile transactions are present on the blockchain 206 in compliance with the transaction creation profile and if they are compliant the method loops to continually monitor at 336. Where non-compliance is detected the method identifies a malicious or erroneous event at 340 and can undertake mitigating or remediation measures as previously described.

While the security component 202 has been described as a multi-threaded component it will be appreciated that multiple components could be provided for undertaking the operations of each of the threads 334 and 318.

Figure 4:
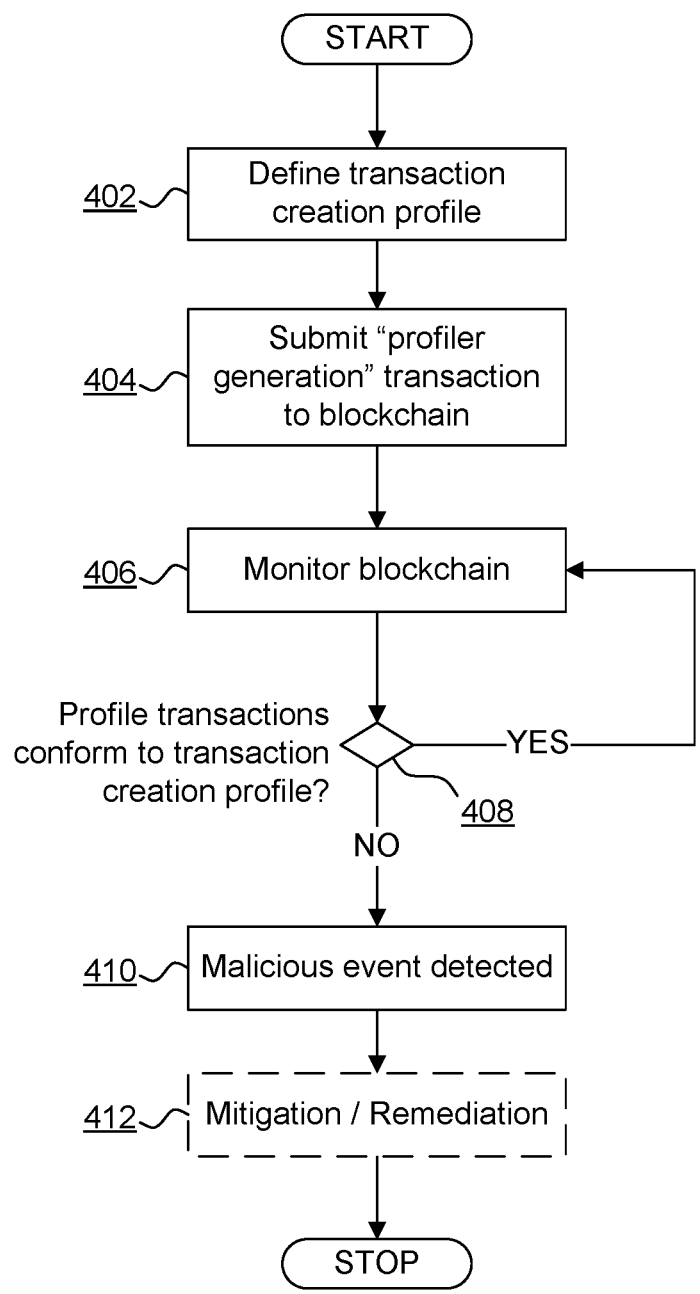
FIG. 4 is an exemplary flowchart of a method to detect malicious events occurring with respect to a blockchain in accordance with an embodiment.

FIG. 4 is an exemplary flowchart of a method to detect malicious events occurring with respect to a blockchain 206 in accordance with an embodiment. Initially, at 402, the method defines a transaction creation profile. At 404 the method submits a "profiler generation" transaction to the blockchain 206 which, when validated, results in the generation of a profiler data structure stored in the blockchain 206. At 406 the method monitors the blockchain 206, and at 408 the method determines if the profile transactions stored in the blockchain 206 are compliant with the transaction creation profile. Where compliance is determined the method iterates to 406. Where non-compliance is determined the method concludes detection of a malicious or erroneous occurrence with respect to the blockchain 206 at 410. Optionally the method employs remediation or mitigation measures at 412 as previously described.

One blockchain-based environment suitable for the implementation of embodiments is the Ethereum environment. The paper "Ethereum: A Secure Decentralised Generalised Transaction Ledger" (Wood, Ethereum, 2014) (hereinafter "Ethereum") provides a formal definition of a generalized transaction based state machine using a blockchain as a decentralized value-transfer system.

In an Ethereum embodiment, profiler is implemented as an Ethereum account having associated logic for checking the transaction creation profile and generating profile transactions. Accordingly the profiler constitutes an Ethereum contract (or smart contract). In use in an Ethereum embodiment the profiler contract can be triggered as previously described to test whether a profile transaction should be generated. Profile transactions are generated as Ethereum message transactions at appropriate points.

Insofar as embodiments described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for detecting malicious attacks presenting a threat to a blockchain associated with a blockchain data structure of a computing device comprising:

defining by the computing device a transaction creation profile according to which transactions can be generated and submitted to the blockchain;

submitting a transaction to the blockchain, the transaction causing the generation of a profiler data structure in the blockchain including executable code to generate profile transactions to be submitted to the blockchain according to the transaction creation profile;

monitoring by the computing device the blockchain to identify profile transactions based on profile transactions submitted by the profile data structure generated in the blockchain; and comparing identified profile transactions with the transaction creation profile to detect a deviation from the transaction creation profile, such detection corresponding to a malicious attack occurring with respect to the blockchain.

2. A method according to claim 1, wherein the profile transactions include an address of the profiler data structure, and wherein monitoring the blockchain includes monitoring transactions including the address of the profiler data structure.

3. A method according to claim 1, further comprising repeatedly generating transactions directed to the profiler data structure and submitted to the blockchain so as to trigger execution of the executable code of the profiler data structure.

4. A method according to claim 1, wherein transactions submitted to the blockchain are processed by miner software components to validate the transactions and commit the transactions to a block for addition to the blockchain.

5. A method according to claim 1, further comprising, in response to the detection of a deviation from the transaction creation profile, generating a notification signal for communication to one or more entities operating with the blockchain to flag the malicious event.

6. A method according to claim 1, further comprising, in response to the detection of a deviation from the transaction creation profile, ceasing operation with the blockchain.

7. A computer program product embodied in a non-transitory computer-readable storage medium having computer program code to, when loaded into a computer system and executed thereon, cause the computer to perform the method as claimed in claim 1.

8. A computer system to detect malicious attacks presenting a threat to a blockchain associated with a blockchain data structure, the computer system comprising:

a processor device and a data store, wherein the processor device is configured to:

define a transaction creation profile according to which transactions can be generated and submitted to the blockchain;

submit a transaction to the blockchain, the transaction causing the generation of a profiler data structure in the blockchain including executable code to generate profile transactions to be submitted to the blockchain according to the transaction creation profile;

monitor the blockchain to identify profile transactions based on profile transactions submitted by the profile data structure generated in the blockchain; and compare identified profile transactions with the transaction creation profile to detect a deviation from the transaction creation profile, such detection corresponding to a malicious attack occurring with respect to the blockchain.

9. The computer system of claim 8, wherein the profile transactions include an address of the profiler data structure, and wherein monitoring the blockchain includes monitoring transactions including the address of the profiler data structure.

10. The computer system of claim 8, wherein the processor device is further adapted to repeatedly generate transactions directed to the profiler data structure and submitted to the blockchain so as to trigger execution of the executable code of the profiler data structure.

11. The computer system of claim 8, wherein transactions submitted to the blockchain are processed by miner software components to validate the transactions and commit the transactions to a block for addition to the blockchain.

12. The computer system of claim 8, wherein the processor device is further adapted to, in response to the detection of a deviation from the transaction creation profile, generate a notification signal for communication to one or more entities operating with the blockchain to flag the malicious event.

13. The computer system of claim 8, wherein the processor device is further adapted to, in response to the detection of a deviation from the transaction creation profile, cease operation with the blockchain.

* * * * *

UNITED STATES PATENT AND TRADEMARK OFFICE
CERTIFICATE OF CORRECTION

PATENT NO. : 9,807,106 B2  
APPLICATION NO. : 15/223261  
DATED : October 31, 2017  
INVENTOR(S) : Daniel et al.

Page 1 of 1

It is certified that error appears in the above-identified patent and that said Letters Patent is hereby corrected as shown below:

In the Claims

In Column No. 8, Line(s) 37, Claim 1, "profile data structure" to read as --profiler data structure--

In Column No. 8, Line(s) 62, Claim 5, "malicious event." to read as --malicious attack.--

In Column No. 9, Line(s) 18-19, Claim 8, "profile data structure" to read as --profiler data structure--

In Column No. 10, Line(s) 19-20, Claim 12, "malicious event." to read as --malicious attack.--

Signed and Sealed this  
Twenty-fifth Day of December, 2018

Andrei Iancu  
*Director of the United States Patent and Trademark Office*